United States Patent [19]

Haman

[11] Patent Number: 4,821,987
[45] Date of Patent: Apr. 18, 1989

[54] RECREATIONAL VEHICLE AWNING SUPPORT TRUSS AND SYSTEM

[76] Inventor: Charles Haman, P.O. Box 294, Homosassa Springs, Fla. 32647

[21] Appl. No.: 161,913

[22] Filed: Feb. 29, 1988

[51] Int. Cl.[4] .............................................. F16M 11/00
[52] U.S. Cl. .................................................... 248/200
[58] Field of Search ................. 248/200, 273; 52/693, 52/694, 691; 135/89

[56] References Cited

U.S. PATENT DOCUMENTS

| | | | |
|---|---|---|---|
| 2,569,910 | 10/1951 | Venuti | 52/693 X |
| 2,631,900 | 3/1953 | Simpson | 52/693 |
| 3,324,869 | 6/1967 | Duda | 135/89 |
| 3,866,874 | 2/1975 | Upton, Jr. | 248/251 |
| 3,918,510 | 11/1975 | Hayward | 160/68 X |
| 3,949,960 | 4/1976 | McKee | 248/220.2 |
| 4,077,419 | 3/1978 | Lux | 135/89 |
| 4,282,619 | 8/1981 | Rooney | 52/693 X |
| 4,648,573 | 3/1987 | Rubnerth | 248/273 |
| 4,719,954 | 1/1988 | Curtis et al. | 135/89 X |

Primary Examiner—Ramon O. Ramirez

[57] ABSTRACT

A truss for securing an awning support strut or the like to a recreational vehicle having a chassis frame and an awning. The bracket has an inner bearing plate for mounting the bracket on the chassis frame of the vehicle and an outer bearing plate for mounting the awning strut thereupon. The outer bearing plate is maintained in a spaced relationship with the inner bearing plate by a top and an inclined bottom arm connected thereto and extending therebetween. Spaced vertical members connected between the top and bottom arms support the arms and distribute static and dynamic loads imposed by the awning, and diagonal members support the arms and the vertical members in a fixed spacial relationship with each other. A bracing member connected to the bottom arm, proximate the outer bearing plate, and to the outermost diagonal member provides additional support to the outer bearing plate.

25 Claims, 2 Drawing Sheets

RECREATIONAL VEHICLE AWNING SUPPORT TRUSS AND SYSTEM

TECHNICAL BACKGROUND

This invention relates to awning strut support brackets for recreational vehicles.

BACKGROUND ART

A number of brackets have been designed for the purpose of mounting and supporting various recreational vehicle awning struts. Methods have ranged from a simple clevis to sophisticated devices having a variety of latches, pins and the like. The weakest common denominator of these brackets is that they are secured to the recreational vehicle by bolts through the vehicle skins and sometimes into or through wooden body frames. As a result of severe weather or merely normal wear and tear over time, brackets bolted to vehicle skins alone can deform the skins and elongate associated bolt holes, reducing the strength and integrity of the vehicle skins and also the aesthetic and financial values of the vehicle. Elongated bolt holes or holes partially exposed by bolts that have worked loose can admit elements that can cause problems ranging from the discomfort of occupants to serious damage to the wooden frame of the vehicle or to other items therewithin. See, for example, U.S. Pat. Nos. 3,918,510; 3,851,848; 3,949,960; 4,077,419; 4,171,013; 4,641,805; and 4,648,573.

DISCLOSURE OF THE INVENTION

In accordance with the present invention, a support truss, or bracket, is provided that may be permanently or temporarily secured to the chassis frame of a recreational vehicle to rigidly support an awning strut while doing no damage to the skin or to the interior structure or contents of the vehicle.

One embodiment of the invention includes a bracket having vertically, horizontally and diagonally disposed members that are coplanar to preclude the development of any noncoplanar forces as a result of forces imposed by an awning through an associated awning support strut.

Another embodiment of the invention contemplates a plurality of brackets that may be used in combination to form a support system for mounting support struts for an awning or the like to a recreational vehicle having a chassis frame.

An object of the invention is to provide means for securing an awning strut or the like for as long as desired with little likelihood of the strut working loose under forces produced, for example, by wind acting on the awning.

Another object of the invention is to provide means for securing an awning strut or the like without having to violate the integrity of the vehicle body with screws or bolts that penetrate the body skin and often the wooden body frame. This eliminates one possible source of damage, such as deformed skin or elongated mounting holes due to the movement of strut supports insecurely mounted thereon, that can quickly detract from the tangible as well as intangible values of the vehicle. Elongated holes or the spaces around loose bolts can admit elements resulting in the discomfort of occupants of the vehicle or in damage to the wooden body frame or to delicate items stored therewithin.

Yet another object of the invention is to provide a secure awning strut mount that is substantially less likely than are body-mounted supports to fail under forces caused, for example, by strong winds, swinging children, etc. and is thus less likely to be involved in any ensuing property damage or personal injury possibly attending the collapse of an awning structure.

DETAILED DESCRIPTION OF THE PREFERRED EMBODIMENT OF THE INVENTION

Figure 1:
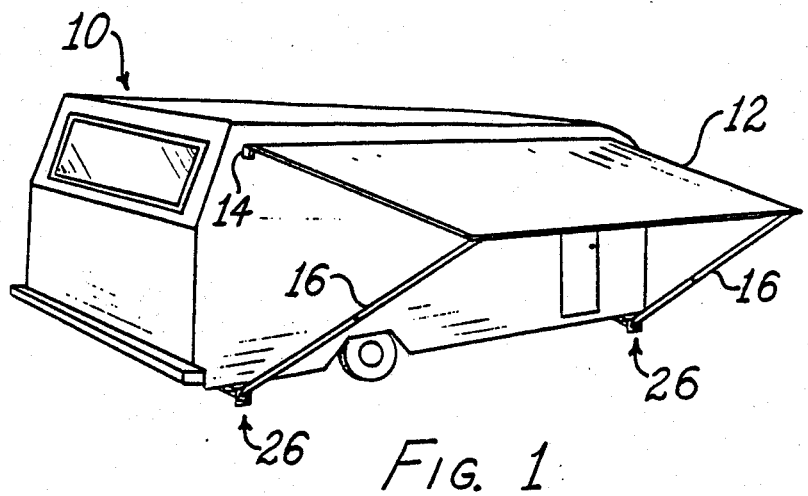
FIG. 1 is a perspective view of a recreational vehicle and the a winning support truss and system embodying features of the invention.

With reference to FIG. 1, shown is a typical recreational vehicle 10 having mounted to its side an awning 12. The awning 12 is extended from a mounting fixture 14 that may, for example, be a hinged or roller device. The outer edge of the awning 12 is supported at the corners thereof by struts 16. Each of the struts 16 is secured at its base to a bracket, or truss arm, 26.

Figure 2:
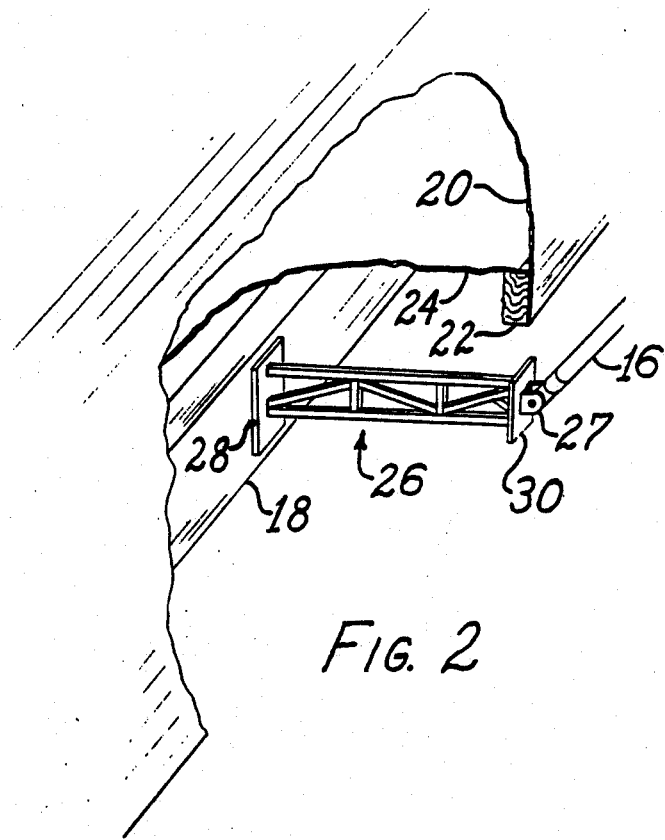
FIG. 2 is a perspective view partly broken away and in section of a portion of the view of FIG. 1.

FIG. 2 shows a portion of the recreational vehicle 10 partly broken away and in section to reveal details of the disposition of one of the brackets 26 and its connection to the vehicle 10. Displayed are portions of the vehicle chassis frame 18, body skin 20, body frame 22 and floor 24. The bracket 26 is shown welded to a portion of the chassis frame 18. The bracket 26 may also be bolted or clamped to the chassis frame 18; however, welding is the preferred method for permanent attachment. The holes required for bolts weaken the frame 18 and expose additional surfaces that might rust, and clamps are likely to loosen due to vibration or impact when the vehicle is underway.

Shown also is a strut mounting device 27 for mounting the awning support strut 16 to the bracket 26. The strut mounting device 27 is a clevis that pivotally engages the base of the strut 16, allowing the latter to be angularly disposed with respect to the side of the vehicle 10 in a variety of convenient positions that enable the awning 12 to be partially or fully deployed or completely retracted. The strut 16 may be fabricated using telescoping tubes, or ½-inch solid square steel, to secure the awning 12.

Figure 3:
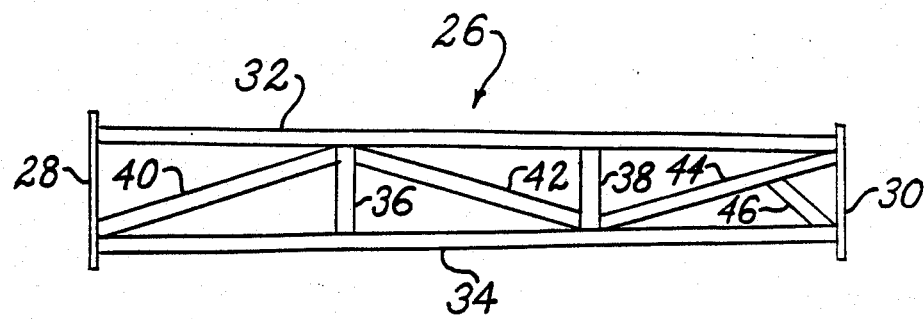
FIG. 3 is a side view of the awning support truss.

FIG. 3 shows a detailed view of the bracket, or truss arm, generally indicated by reference number 26. The bracket 26 has an inner bearing plate 28 and an outer bearing plate 30 in spaced relationship to each other. An upper truss, or top, arm 32 is rigidly connected to and disposed laterally between the inner and outer bearing plates 28 and 30 respectively, and a lower truss, or bottom, arm 34 lies below the top arm 32. The bottom arm 34 is also rigidly connected to the inner and outer bearing plates 28 and 30. In the preferred embodiment, the top arm 32 extends horizontally from the inner bearing plate 28 to the outer bearing plate 30; and the bottom arm 34 extends outwardly and upwardly, typically by one to three degrees, from the inner bearing plate 28 to the outer bearing plate 30. The inclined disposition of the bottom arm 34 introduces a vertical, lifting component that assists in supporting the outer bearing plate 30.

A first vertical member 36 extends vertically between and is rigidly connected to the top arm 32 and to the bottom arm 34 outwardly of the inner bearing plate 28, and a second vertical member 38 extends vertically between and is rigidly connected to the top arm 32 and to the bottom arm 34 outwardly of the first vertical member 36. The vertical members 36 and 38 are substantially parallel to and equally spaced with respect to each other and to the inner and outer bearing plates 28 and 30.

A first diagonal member 40 is rigidly connected to the inner bearing plate 28 proximate the bottom arm 34 and extends outwardly and upwardly therefrom and is rigidly connected to the first vertical member 36 proximate the top arm 32. A second diagonal member 42 is rigidly connected to the first vertical member 36 proximate the top arm 32 and extends outwardly and downwardly therefrom and is rigidly connected to the second vertical member 38 proximate the bottom arm 34. A third diagonal member 44 is rigidly connected to the second vertical member 38 proximate the bottom arm 34 and extends outwardly and upwardly therefrom and is rigidly connected to the outer bearing plate 30 proximate the top arm 32.

A bracing member 46 is rigidly connected to the bottom arm 34 proximate the outer bearing plate 30 and extends rearwardly and upwardly therefrom and is rigidly connected to the third diagonal member 44, to provide a lifting support to the truss arm proximate the outer bearing plate 30, at a point mediate between the second vertical member 38 and the outer bearing plate 30 and typically at a point between about one quarter and about one third of the length of the third diagonal member 44 from the outer bearing plate 30.

In operation, the inner bearing plate 28 of the awning support bracket 26 may be rigidly secured to the chassis frame 18 of the recreational vehicle 10 by welding, bolting, clamping or any like method; and the plate 28 may be drilled and tapped to facilitate being so mounted. The preferred method of mounting, however, is to weld the plate 28 to the frame 18 since holes required for bolts in the frame 18 reduce its strength and expose additional surfaces that might rust. The outer bearing plate 30 may also be drilled and tapped to receive and mount thereupon an awning strut 16.

The vertical members 36 and 38 support the top and bottom arms 32 and 34 and distribute static and dynamic loads imposed by the awning. The diagonal members 40, 42 and 44 support the top and bottom arms 32 and 34 and the first and second vertical members 36 and 38 in a fixed spacial relationship with each other. The top and bottom arms 32 and 34, the vertical members 36 and 38, the diagonal members 40, 42 and 44, and the bracing member 46 are coplanar to preclude the development of any noncoplanar forces as a result of forces imposed by the awning 12 through the awning support strut 16.

What is claimed is:

1. On a recreational vehicle having a chassis frame and an awning, which provides shelter during various weather conditions, a truss arm for securing an awning support strut or the like, the truss arm comprising:
    an inner bearing plate for rigidly mounting the truss arm on the chassis frame of the recreational vehicle;
    a truss structure having a proximal end and a distal end and being rigidly connected at the proximal end to said inner bearing plate and extending outwardly therefrom, said truss structure including:
    an upper truss arm rigidly connected to said inner bearing plate and extending laterally in an outward direction;
    a lower truss arm rigidly connected to said inner bearing plate and extending laterally in an outward direction;
    a first vertical member disposed outwardly of said inner bearing plate and rigidly connected to and disposed between said upper truss arm and said lower truss arm;
    a first diagonal member rigidly connected to said inner bearing plate proximate said lower truss arm and extending upwardly therefrom in an outward direction and rigidly connected to said first vertical member proximate said upper truss arm;
    a second vertical member disposed outwardly from said first vertical member and rigidly connected to and disposed between said upper truss arm and said lower truss arm, said first and said second vertical members supporting said upper and said lower truss arms and distributing static and dynamic loads imposed by the awning;
    a second diagonal member rigidly connected to said first vertical member proximate said upper truss arm and extending downwardly therefrom in an outward direction and rigidly connected to said second vertical member proximate said lower truss arm;
    a third diagonal member rigidly connected to said second vertical member proximate said lower truss arm and extending upwardly therefrom in an outward direction to a point proximate the outermost end of said upper truss arm, said diagonal members supporting said upper and said lower truss arms and said vertical members in a fixed spacial relationship with each other; and
    a bracing member rigidly connected to said lower truss arm proximate the outermost end thereof and extending upwardly and inwardly from said lower truss arm and rigidly connected to said third diagonal member mediate between said second vertical member and the outermost end of said upper truss arm; and
    an outer bearing plate for receiving and mounting the awning strut thereupon, said outer bearing plate being disposed in spaced apposition to said inner bearing plate and rigidly connected at the distal end of said truss arm to the outermost ends of said upper and said lower truss arms and said third diagonal member.

2. A truss arm according to claim 1 wherein said lower truss arm extends laterally and upwardly in an outward direction from said inner bearing plate to provide a vertical component of support to oppose forces exerted downwardly by the awning through the support strut.

3. A truss arm according to claim 1 wherein said first and said second vertical members are substantially parallel to and equally spaced with respect to each other and to said inner and said outer bearing plates to support said upper and said lower truss arms and to distribute uniformly static and dynamic loads imposed by the awning through the support strut.

4. A truss arm according to claim 1 wherein said upper and said lower truss arms, said vertical members, said diagonal members and said bracing member are substantially coplanar to preclude the development of any noncoplanar forces in the truss arm imposed by the awning through the awning support strut.

5. A truss arm according to claim 1 wherein said bracing member is rigidly connected to said third diagonal member at a point between about one quarter and about one third of the length of said third diagonal member from said outer bearing plate to provide a lifting support to the truss arm proximate the awning support strut.

6. On a recreational vehicle having a chassis frame and an awning, which provides shelter during various weather conditions, a bracket for securing an awning support strut or the like, the bracket comprising:
 an inner bearing plate for mounting the bracket on the chassis frame of the vehicle;
 an outer bearing plate for receiving and mounting the awning support strut thereupon, said outer bearing plate being disposed in spaced apposition to said inner bearing plate;
 a top arm rigidly connected to and disposed laterally between said inner bearing plate and said outer bearing plate;
 a bottom arm rigidly connected to and disposed laterally between said inner bearing plate and said outer bearing plate, said arms rigidly securing said outer bearing plate in a spaced relationship with said inner bearing plate;
 a first vertical member rigidly connected to said top arm and to said bottom arm;
 a second vertical member disposed outwardly from said first vertical member and rigidly connected to said top arm and to said bottom arm to support said arms and to distribute static and dynamic loads imposed by the awning;
 a first diagonal member rigidly connected to said inner bearing plate proximate said bottom arm and extending outwardly and upwardly toward and rigidly connected to said first vertical member adjacent the connection thereof to said top arm;
 a second diagonal member rigidly connected to said first vertical member proximate said top arm and extending outwardly and downwardly toward and rigidly connected to said second vertical member adjacent the connection thereof to said bottom arm;
 a third diagonal member rigidly connected to said second vertical member proximate said bottom arm and extending outwardly and upwardly toward and rigidly connected to said outer bearing plate adjacent the connection thereto of said top arm, said diagonal members supporting said arms and said vertical members in a fixed spacial relationship with each other; and
 a bracing member rigidly connected to said bottom arm proximate said outer bearing plate to provide added support to said outer bearing plate proximate the awning support strut and extending inwardly and upwardly from said bottom arm and rigidly connected to said third diagonal member mediate between said second vertical member and said outer bearing plate.

7. A bracket according to claim 6 wherein said bottom arm extends laterally and upwardly in an outward direction from said inner bearing plate to provide a vertical component of support to oppose forces exerted downwardly by the awning through the support truss.

8. A bracket according to claim 6 wherein said first and said second vertical members are substantially parallel to and equally spaced with respect to each other and to said inner and said outer bearing plates to support said top and said bottom arms and to uniformly distribute static and dynamic loads imposed by the awning.

9. A bracket according to claim 6 wherein said top and said bottom arms, said vertical members, said diagonal members and said bracing member are substantially coplanar to preclude the development in the truss arm of any noncoplanar forces imposed by the awning through the awning support strut.

10. A bracket according to claim 6 wherein said bracing member is rigidly connected to said third diagonal member at a point between about one quarter and about one third of the length of said third diagonal member from said outer bearing plate to provide a lifting support to the truss arm proximate the awning support strut.

11. On a recreational vehicle having a frame, a system for supporting an awning pivotally or retractably mounted to the recreational vehicle, the system comprising:
 a plurality of awning support struts for supporting the awning, the top ends of said struts being pivotally secured to or near the outer edge of the awning;
 a strut mounting device secured to the bottom end of each of said struts; and
 a plurality of brackets, said brackets each having:
 an inner bearing plate for rigidly mounting said bracket to the chassis frame of the vehicle;
 an outer bearing plate, for receiving and mounting said strut mounting device thereupon, said outer bearing plate being disposed in spaced apposition to said inner bearing plate;
 a top arm rigidly connected to and disposed laterally between said inner bearing plate and said outer bearing plate;
 a bottom arm rigidly connected to and disposed between said inner bearing plate and said outer bearing plate, said arms rigidly securing said outer bearing plate in a spaced relationship with said inner bearing plate;
 a first vertical member rigidly connected to said top arm and to said bottom arm;
 a second vertical member rigidly disposed outwardly from said first vertical member and connected to said top arm and to said bottom arm to support said arms and to distribute static and dynamic loads imposed by the awning;
 a first diagonal member rigidly connected to said inner bearing plate proximate said bottom arm and extending outwardly and upwardly toward and rigidly connected to said first vertical member adjacent the connection thereof to said top arm;
 a second diagonal member rigidly connected to said first vertical member proximate said top arm and extending outwardly and downwardly toward and rigidly connected to said second vertical member adjacent the connection thereof to said bottom arm;
 a third diagonal member rigidly connected to said second vertical member proximate said and extending outwardly and upwardly toward and rigidly connected to said outer bearing plate adjacent the connection thereto of said top arm, said diagonal members supporting said arms and said vertical members in a fixed spacial relationship with each other; and
 a bracing member rigidly connected to said bottom arm proximate said outer bearing plate to provide added support to said outer bearing plate proximate the awning support strut and extending inwardly and upwardly from said bottom arm and rigidly connected to said third diagonal member mediate between said second vertical member and said outer bearing plate.

12. A system according to claim 11 wherein said bottom arm of each of said brackets extends laterally and upwardly in an outward direction from said inner bearing plate to provide a vertical component of support to oppose forces exerted downardly by the awning through the support strut.

13. A system according to claim 11 wherein said first and said second vertical members of each of said brackets are substantially parallel to and equally spaced with respect to each other and to said inner and said outer bearing plates to support said top and said bottom arms and to uniformly distribute static and dynamic loads imposed by the awning by the awning support strut.

14. A system according to claim 11 wherein said top and said bottom arms, said vertical members, said diagonal members and said bracing member of each of said brackets are substantially coplanar to preclude the development in the bracket of any noncoplanar forces imposed by the awning through the awning support strut.

15. A system according to claim 11 wherein said bracing member of each of said brackets is rigidly connected to said third diagonal member at a point between about one quarter and about one third of the length of said third diagonal member from said outer bearing plate to provide a lifting support to the truss arm proximate the awning support strut.

16. A system according to claim 11 wherein said awning support struts are each formed of lockable, telescoping tubes such that said strut may be adjusted to and maintained at a variety of lengths to conform to the amount of awning deployed.

17. A system according to claim 11 wherein said awning support struts are each formed of lockable, folding members such that said strut may be adjusted to and maintained at a variety of lengths to conform to the amount of awning deployed.

18. A system according to claim 11 wherein each of said awning support struts is pivotally mounted to said outer bearing plate of a respective one of said brackets.

19. A system according to claim 18 wherein said strut mounting device comprises a clevis for receiving and pivotally mounting one of said awning support struts to said outer bearing plate of a respective one of said brackets.

20. A system according to claim 11 wherein the length of said brackets is such that said outer bearing plates are in substantial vertical alignment with the inner edge of the awning.

21. A process for constructing a truss arm for securing an awning support strut or the like to a recreational vehicle having a chassis frame and an awning, which provides shelter during various weather conditions, the process comprising the following steps:
disposing an inner bearing plate, for rigidly mounting the truss arm on the vehicle frame, in spaced apposition to an outer bearing plate, for receiving and mounting thereto an awning support strut;
rigidly connecting an upper truss arm to and horizontally between said inner bearing plate and said outer bearing plate;
rigidly connecting a lower truss arm to and between said inner bearing plate and said outer bearing plate, said arms rigidly securing said outer bearing plate in a spaced relationship with said inner bearing plate;
rigidly connecting a first vertical member to and between said upper truss arm and said lower truss arm;
rigidly connecting a second vertical member to and between said upper truss arm and said lower truss arm, said second vertical truss arm being disposed outwardly from said first vertical member;
rigidly connecting a first diagonal member to and between said inner bearing plate and said first vertical member, said first diagonal member extending from said inner bearing plate proximate said lower truss arm outwardly and upwardly to said first vertical member adjacent the connection thereof to said upper truss arm;
rigidly connecting a second diagonal member to and between said first vertical member and said second vertical member, said second diagonal member extending from said first vertical member proximate said upper truss arm outwardly and downwardly to said second vertical member adjacent the connection thereof to said lower truss arm;
rigidly connecting a third diagonal member to and between said second vertical member and said outer bearing plate, said third diagonal member extending from said second vertical member proximate said lower truss arm outwardly and upwardly to said outer bearing plate adjacent the connection thereto of said upper truss arm, said diagonal members supporting said truss arms and said vertical members in a fixed spacial relationship with each other; and
rigidly connecting a bracing member to and between said lower truss arm and said third diagonal member, said bracing member extending from said lower truss arm proximate said outer bearing plate inwardly and upwardly to said third diagonal member mediate between said second vertical member and said outer bearing plate to provide added support to said outer bearing plate proximate the awning support strut.

22. A process for constructing a truss arm according to claim 21 wherein said lower truss arm extends laterally and upwardly in an outward direction from said inner bearing plate to provide a vertical component of support to oppose forces exerted downwardly by the awning through the support strut.

23. A process for constructing a truss arm according to claim 21 wherein said first and said second vertical members are substantially parallel to and equally spaced with respect to each other and to said inner and said outer bearing plates to support said upper and said lower truss arms and to uniformly distribute static and dynamic loads imposed by the awning through the awning support.

24. A process for constructing a truss arm according to claim 21 wherein said upper and said lower truss arms, said vertical members, said diagonal members and said bracing member are substantially coplanar to preclude the development in the truss arm of any noncoplanar forces imposed by the awning through the awning support strut.

25. A process for constructing a truss arm according to claim 21 wherein said bracing member is rigidly connected to said third diagonal member at a point between about one quarter and about one third of the length of said third diagonal member from said outer bearing plate to provide a lifting support to the truss arm proximate the awning support strut.

* * * * *